United States Patent
Takahama et al.

(10) Patent No.: US 7,136,750 B2
(45) Date of Patent: Nov. 14, 2006

(54) OBSTACLE DETECTION APPARATUS AND METHOD FOR AUTOMOTIVE VEHICLE

(75) Inventors: Taku Takahama, Kanagawa (JP); Takeshi Kimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 151 days.

(21) Appl. No.: 10/878,213

(22) Filed: Jun. 29, 2004

(65) Prior Publication Data

US 2005/0004761 A1    Jan. 6, 2005

(30) Foreign Application Priority Data

Jul. 1, 2003    (JP)    ............... 2003-189615

(51) Int. Cl.
*G01C 21/26*    (2006.01)

(52) U.S. Cl. .............. 701/213; 701/207; 701/214; 701/216; 701/222; 701/300; 701/301; 340/435; 340/436

(58) Field of Classification Search ............... 701/207, 701/213, 214, 216, 220, 222, 224, 225, 300, 701/301; 340/988, 425.5, 435, 436, 438, 340/439; 348/148
See application file for complete search history.

(56) References Cited

U.S. PATENT DOCUMENTS 6,888,622 B1 * 5/2005 Shimomura ............... 356/4.01

FOREIGN PATENT DOCUMENTS

JP    7-125567 A    5/1995

OTHER PUBLICATIONS

U.S. Appl. No. 10/878,391, filed Jun. 29, 2004, Takahama et al.

* cited by examiner

*Primary Examiner*—Gertrude A. Jeanglaude
(74) *Attorney, Agent, or Firm*—Foley & Lardner LLP

(57) ABSTRACT

In obstacle detection apparatus and method for an automotive vehicle, a first importance as obstacle representing a possibility that a selected object becomes an obstacle for the vehicle is calculated, a second importance as obstacle representing a possibility that the object under a tracking becomes the obstacle for the vehicle is calculated, a determination of whether the selected object is the same as that under the tracking is made, and the object which is tracked at the image processing object tracking is selected on the basis of the first importance as obstacle and the second importance as obstacle when determining that the selected object is not the same as that under the tracking.

20 Claims, 16 Drawing Sheets

FIG.8

IMPORTANCE AS OBSTACLE OF R IS A POSSIBILITY THAT THE OBJECT DETECTED BY THE LASER RADAR BECOMES AN OBSTACLE

IMPORTANCE AS OBSTACLE OF C IS A POSSIBILITY THAT THE OBJECT IN TRACKING THROUGH THE IMAGE PROCESSING BECOMES AN OBSTACLE

| CONDITION | ACTION THROUGH IMAGE PROCESSING | ADVANTAGES |
|---|---|---|
| IMPORTANCE AS OBSTACLE R < IMPORTANCE AS OBSTACLE C | TRACKING OF OBJECT THROUGH IMAGE PROCESSING IS CONTINUED | IT IS POSSIBLE TO SWITCH APPROPRIATELY THE OBJECT TO BE UNDER IMAGE PROCESSING |
| IMPORTANCE AS OBSTACLE R > IMPORTANCE AS OBSTACLE C | TRACKING FOR THE OBJECT THROUGH IMAGE PROCESSING IS FORCIBLY ENDED AND FIRST EXTRACTION PROCESS ON THE BASIS OF THE POSITION OF THE LASER RADAR DETECTED OBJECT | |
| IMPORTANCE AS OBSTACLE OF R AND IMPORTANCE AS OBSTACLE OF C < PREDETERMINED VALUE | | IMAGE IS PREPARED AGAINST A FUTURE DANGER |
| IMPORTANCE AS OBSTACLE OF R AND IMPORTANCE AS OBSTACLE OF C > PREDETERMINED VALUE | TRACKING OF OBJECT THROUGH IMAGE PROCESSING IS CONTINUED | IT IS POSSIBLE TO MAKE AN ACCURATE SELECTION OF AN OBJECT TO BE CONTROLLED |

FIG.11

A RELIABILITY OF AN IMAGE PROCESSING MEANS
A POSITIONAL ACCURACY OF THE IMAGE PROCESSING

THE IMAGE PROCESSING DOES NOT FUNCTION AT RANDOM

| CONDITION | | | ACTION THROUGH IMAGE PROCESSING | ADVANTAGES |
|---|---|---|---|---|
| RELIABILITY OF IMAGE PROCESSING=HIGH | | | TRACKING OF OBJECT THROUGH THE IMAGE PROCESSING IS CONTINUED | A REDUNDANT SYSTEM CAN BE CONSTRUCTED AND IT IS POSSIBLE TO PREPARE A LOST OF OBJECT IN THE RADAR TRACKING |
| IMAGE PROCESSING RELIABILITY =LOW | IMPORTANCE AS OBSTACLE OF R OR C: HIGH | | | |
| | IMPORTANCE AS OBSTACLE OF R OR C: LOW | | TRACKING OF OBJECT THROUGH THE IMAGE PROCESSING IS FORCIBLY ENDED AND THE FIRST EXTRACTION PROCESS ON THE BASIS OF THE POSITION OF THE RADAR DETECTED OBJECT IS EXECUTED | HIGH ACCURACY OF POSITION IS CARRIED OUT TO PREPARE AGAINST A FUTURE DANGER |

FIG.17

| CONDITION | | LONGITUDINAL POSITION | LATERAL POSITION | ADVANTAGES |
|---|---|---|---|---|
| RADAR DETECTED OBJECT ≠ IMAGE PROCESSING DETECTED OBJECT | IMPORTANCE AS OBSTACLE OF R < IMPORTANCE AS OBSTACLE OF C | IMAGE TRACKED OBJECT | | |
| | IMPORTANCE AS OBSTACLE OF R > IMPORTANCE AS OBSTACLE OF C | RADAR DETECTED OBJECT | | AN APPROPRIATE OBJECT CAN BE OUTPUTTED TO A LATER STAGE |
| | IMPORTANCE AS OBSTACLE OF R AND IMPORTANCE AS OBSTACLE OF C < PREDETERMINED VALUE | RADAR DETECTED OBJECT | | |
| | IMPORTANCE AS OBSTACLE OF R AND IMPORTANCE AS OBSTACLE OF C > PREDETERMINED VALUE | OBJECT REQUIRING A HIGH BRAKING FORCE | | IT IS POSSIBLE TO PERFORM A CONTROL OVER A WIDE RANGE |
| RADAR DETECTED OBJECT = IMAGE PROCESSING DETECTED OBJECT | RELIABILITY OF IMAGE PROCESSING=HIGH | RADAR DETECTED OBJECT | IMAGE TRACKED OBJECT | IT IS SIMPLY POSSIBLE TO MAKE A HIGH ACCURACY OF OUTPUT POSITION |
| | RELIABILITY OF IMAGE PROCESSING=LOW | RADAR DETECTED OBJECT | | |

OBSTACLE DETECTION APPARATUS AND METHOD FOR AUTOMOTIVE VEHICLE

BACKGROUND OF THE INVENTION

1. Field of the Invention

The present invention relates to obstacle detection apparatus and method for an automotive vehicle which are capable of detecting a position of an object with a high accuracy by trapping redundantly a detected object of a distance measuring (ranging) sensor such as a laser radar or millimeter-wave radar and of a camera such as a CCD (Charge Coupled Device) camera or CMOS (Complementary Monolithic Oxide Semiconductor) camera and are capable of compensating for a lost of the trapped object by means of the ranging sensor.

2. Description of the Related Art

A Japanese Patent Application First Publication No. Heisei 7-125567 published on May 16, 1995 exemplifies a previously proposed obstacle detection apparatus for the automotive vehicle. In the previously proposed obstacle detection apparatus, in a case where the laser radar detects an object, a stereo camera serves to detect the object redundantly for an image region corresponding to a position of the object detected by the laser radar to aim at an improvement in a reliability. In the previously proposed obstacle detection apparatus, the image processing region to be redundantly detected by the camera is limited on the basis of the position of a preceding vehicle traveling in a forward direction of the vehicle, it is possible to execute the image processing at a high speed.

SUMMARY OF THE INVENTION

However, since, in the previously proposed obstacle recognition apparatus, both of the radar and the image trap the same object, the vehicle in which the previously proposed obstacle detection apparatus is mounted cannot cope with such a future collision scene as will be described below. That is to say, after the vehicle driver steers the vehicle through a steering wheel to avoid the collision against a first object whish is stopped, the vehicle approaches to another object (another vehicle) near to and behind the first object traveling at a low speed. Or, while the vehicle is traveling in a straight line road and the vehicle passes near the first object which is stopped. At this time, in a case in which such a situation that in which the vehicle approaches excessively to the first object which is stopped occurs, a whole system cannot detect such a situation as described above. There is no problem that the image processing causes both of the first object which is stopped and the other object (the other vehicle) which is traveling at the low speed to be tracked simultaneously. However, a CPU capability at the present time or in a near future limits the number of objects which are enabled to be image processed to only one.

It is, hence, an object of the present invention to provide obstacle detection apparatus and method which are capable of switching an object to be image processed at an approximate timing according to a situation when a plurality of objects are present in a front detection zone of the vehicle.

According to one aspect of the present invention, there is provided an obstacle detection apparatus for an automotive vehicle, comprising: an object position detecting section that detects a position of each object located in a forward detection zone of the vehicle; an image fetching section that fetches a situation of the forward detection zone in a form of an image; a noticeable object selecting section that selects only one of most noticeable objects for the vehicle on the basis of the detected position of each object; an image processing object tracking section that tracks the selected object by the noticeable object selecting section through an image processing for the fetched image; a first importance as obstacle calculating section that calculates a first importance as obstacle representing a possibility that the selected object becomes an obstacle for the vehicle; a second importance as obstacle calculating section that calculates a second importance as obstacle representing a possibility that the object under a tracking becomes the obstacle for the vehicle; a same object determining section that determines whether the selected object is the same as that under the tracking; and a tracking object selecting section that selects the object which the image processing object tracking section tracks on the basis of the first importance as obstacle and the second importance as obstacle when the same object determining section determines that the selected object is not the same as that under the tracking.

According to another aspect of the present invention, there is provided an obstacle detection method for an automotive vehicle, comprising: detecting a position of each object located in a forward detection zone of the vehicle; fetching a situation of the forward detection zone in a form of an image; selecting only one of most noticeable objects for the vehicle on the basis of the detected position of each object; tracking the selected object by the noticeable object selecting section through an image processing for the fetched image; calculating a first importance as obstacle representing a possibility that the selected object becomes an obstacle for the vehicle; calculating a second importance as obstacle representing a possibility that the object under a tracking becomes the obstacle for the vehicle; determining whether the selected object is the same as that under the tracking; and selecting the object which is tracked at the image processing object tracking on the basis of the first importance as obstacle and the second importance as obstacle when determining that the selected object is not the same as that under the tracking.

This summary of the invention does not necessarily describe all necessary features so that the present invention may also be sub-combination of these described features.

BRIEF DESCRIPTION OF THE DRAWINGS

FIG. 8 is a table representing an action through an image processing and advantages when a detected object through a laser radar and that detected through the image processing are different in a case of the first embodiment shown in FIG. 2.

FIG. 11 is a table representing the action through the image processing and advantages when the detected object through the laser radar and that detected through the image processing are different.

FIG. 17 is a table representing conditions and advantages when the position of the detected object is outputted to a later stage in a case of the third embodiment.

DETAILED DESCRIPTION OF THE PREFERRED EMBODIMENTS

Reference will hereinafter be made to the drawings in order to facilitate a better understanding of the present invention.

Figure 1:
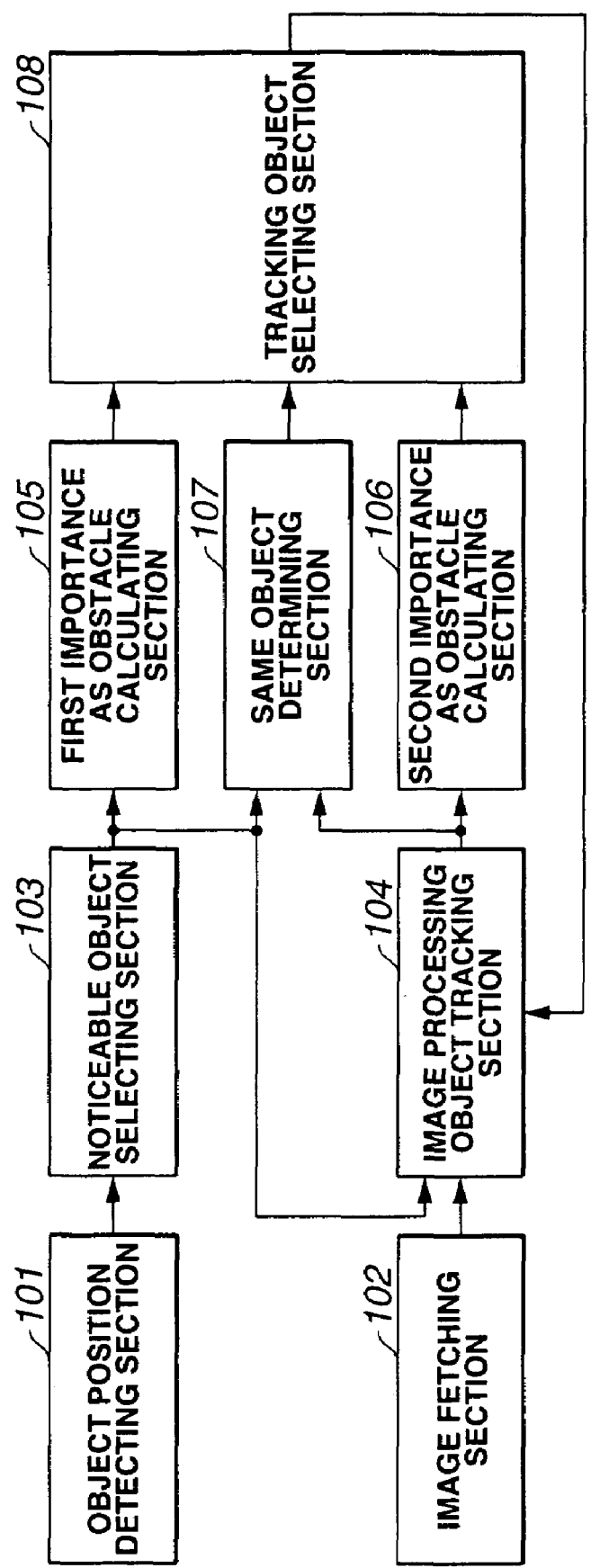
FIG. 1 is a functional block diagram of an obstacle detection apparatus for explaining a general concept of an obstacle detection apparatus according to the present invention

FIG. 1 shows a functional block diagram of an obstacle detection apparatus for an automotive vehicle for explaining a general concept according to the present invention. In FIG. 1, obstacle detection apparatus is constituted by an object position detecting section 101, an image fetching section 102, a noticeable object selecting section 103, an image processing object tracking section 104, a first importance as obstacle calculating section 105, a second importance as obstacle calculating section 106, a same object determining section 107, and a tracking object selecting section 108.

Object position detecting section 101 outputs a relative position of the detected object to a host vehicle in which the obstacle detection apparatus according to the present invention is mounted. Image fetching section 102 photographs an image in a forward photographing zone of the host vehicle. Noticeable object selecting section selects only one most noticeable object for the host vehicle on the basis of an output from object position detecting section 101. Image processing object tracking section 104 refers initially to the object selected by noticeable object selecting section 103 and tracks the object through an image processing by image fetching section 102.

First importance as obstacle calculating section 105 calculates a first importance as obstacle as a possibility that the selected object by noticeable object selecting section 103 becomes an obstacle for the host vehicle. Second importance as obstacle assurance calculating section 106 calculates a second importance as obstacle as a possibility that the object under a tracking through image processing object tracking section 104 becomes the obstacle for the vehicle. Same object determining section 107 determines whether the object selected by noticeable object selecting section 103 is the same object as that under the tracking through image processing object tracking section 104. Tracking object selecting section 108 selects the object to be tracked by means of image processing object tracking section 104 on the basis of a result of determination by means of same object determining section and first and second importance as obstacle.

In the first embodiment, in a case where, in a system in which the number of objects to be enabled to be processed by the image processing is only one object, a plurality of objects are present in the forward photographing zone, the image processing for each of the objects is switched at an appropriate timing so that an actual fusion system can be architected.

Figure 2:
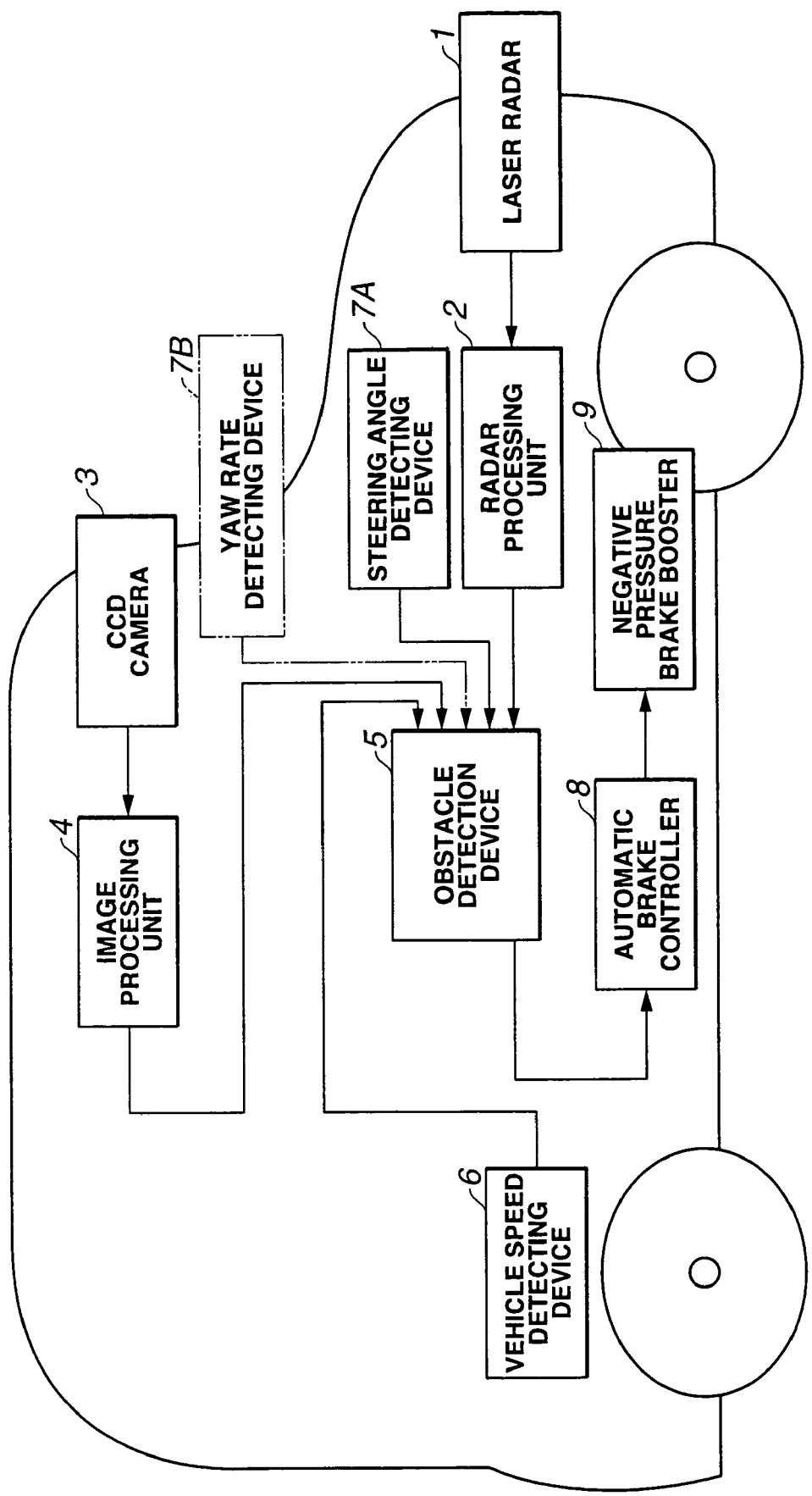
FIG. 2 is a schematic circuit block diagram of the obstacle detection apparatus in a first preferred embodiment according to the present invention.

FIG. 2 shows a hardware structure of the obstacle detection apparatus in a first embodiment according to the present invention. A radar processing unit 2 (corresponds to noticeable object selecting section 103) to extract an obstacle candidate from a result of scanning by means of a scanning type laser radar (object position detecting section) 1 is connected to an obstacle detection device 5. This radar processing unit 2 carries out a calculation of two-dimensional coordinate values (a direction on an inter-vehicle distance and a vehicular width direction) with the vehicle (a host vehicle in which obstacle detection apparatus in the first embodiment is mounted) as an origin for one or a plurality of obstacle candidates and a width (a size) of each of the obstacle candidates.

A progressive scan type CCD camera 3 (image fetching section 102) which grasps a situation of a vehicular forward photographing zone at high speeds is mounted in the vehicle. A result of photographing is supplied to an image processing unit 4 (image processing object tracking section 104). Image processing unit 4 stores the image data on the vicinity to coordinates of obstacle candidates trapped by means of radar processing unit 2 and carries out such a process that the image processing causes the lost object to be detected in a case where the radar detected object is lost due to a pitching variation of a host vehicle body. Outputs of radar processing unit 2 and image processing unit 4 are connected to obstacle detection device 5. A vehicle speed detecting device 6 to detect non-driven left and right road wheel velocities and a steering angle detecting device 7A to detect a front road wheel steering angle are connected to obstacle detection device 5 in order to estimate state variables of the host vehicle. It is noted that a yaw rate detecting device 7B to detect a vehicular yaw rate may be connected to obstacle detection device 5 to detect a way rate of the host vehicle. From such a hardware structure as described above, obstacle detection device 5 carries out a high degree of an obstacle detection system for the automotive vehicle by calculating and processing (performing) the corresponding functions of first importance on obstacle calculating section, second importance as obstacle calculating section, the same object determining section, and the tracking object selecting section.

Obstacle detection device 5 determines accurately whether each object position detected by means of radar processing unit 2 and the position of the object under tracking are selected to determine whether the detected object provides the obstacle for the host vehicle and supplies a result of the determination to a later stage such as an automatic brake controller 8. A negative pressure brake booster 9 to achieve an arbitrary braking force is connected to front and rear road wheels. A braking force command voltage from automatic brake controller 8 of the host vehicle is supplied to a solenoid valve of negative brake booster 9. These radar processing unit 2 and automatic brake controller 8 are constituted by microcomputers, their peripheral parts, various kinds of actuators (drive circuits) and mutually supply and receive the information via communication lines interconnected therebetween.

Next, an operation of the obstacle detection apparatus in the first embodiment will be described below with reference to a series of flowcharts shown in FIGS. 3 through 5.

[Tracking Object Selective Control Process]

Figure 3:
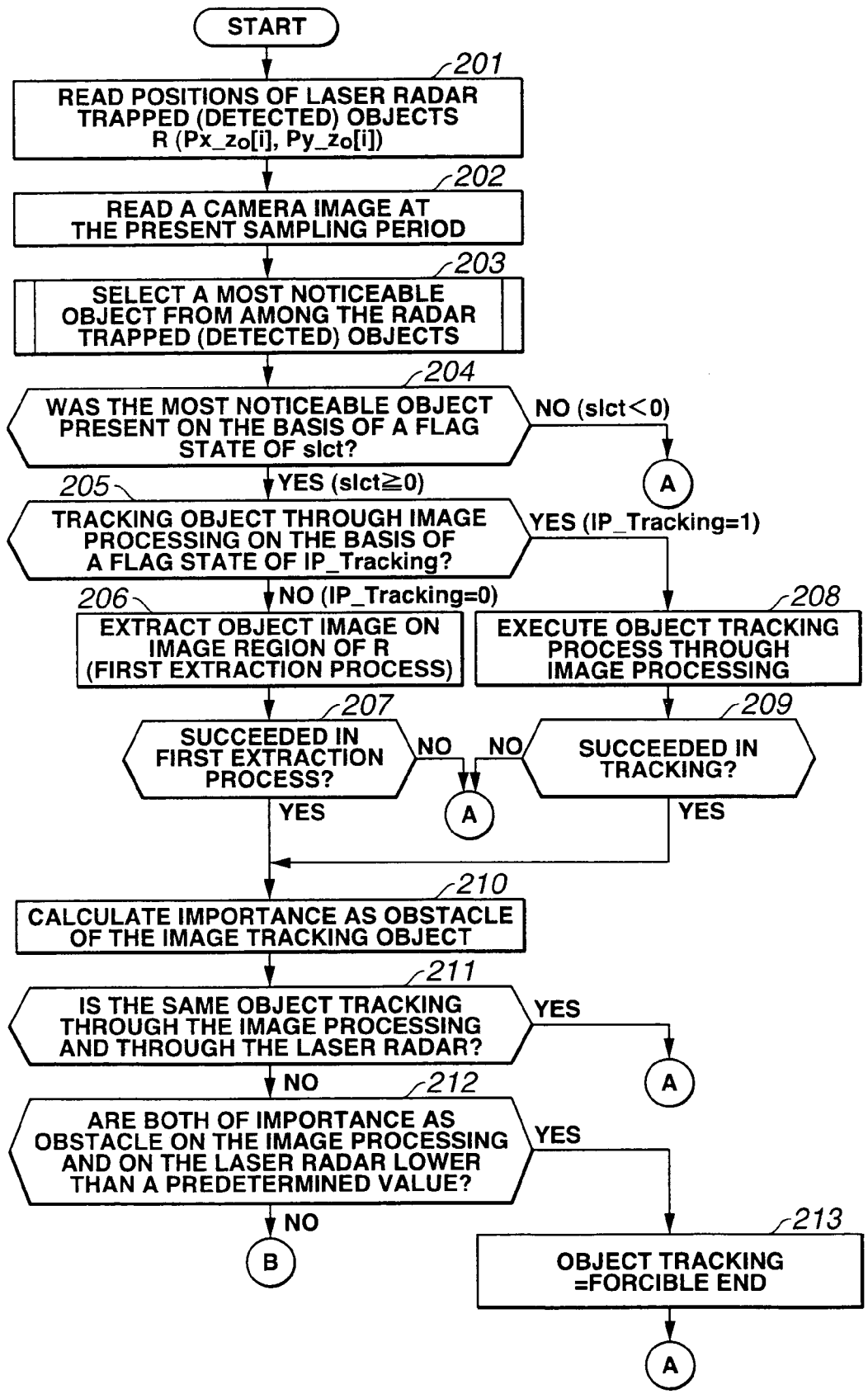
FIG. 3 is a flowchart of a tracking object selective control executed in the obstacle detection apparatus in the first embodiment shown in FIG. 2.
Figure 4:
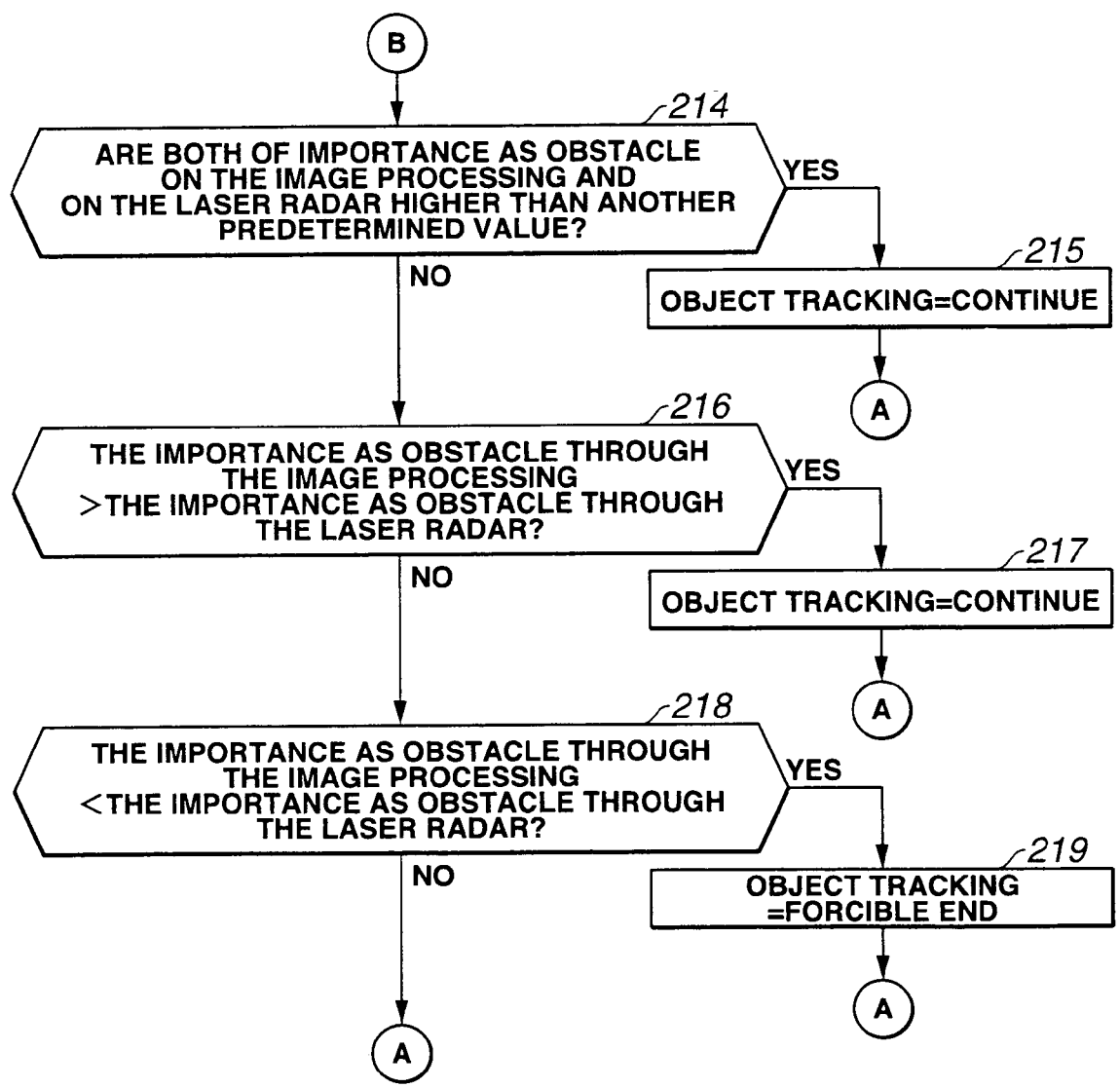
FIG. 4 is a flowchart of the tracking object selective control connected with FIG. 3 and executed in the obstacle detection apparatus in the first embodiment shown in FIG. 2.
Figure 5:
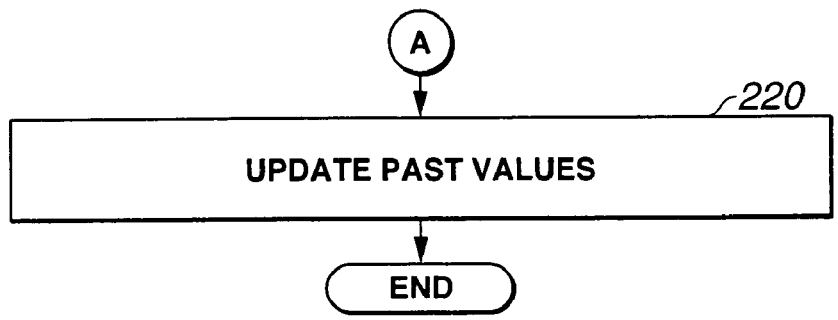
FIG. 5 is a flowchart of the tracking object selective control connected with FIGS. 3 and 4 and executed in the obstacle detection apparatus in the first embodiment shown in FIG. 2.

FIGS. 3 through 5 integrally show a flow of a tracking object selective control process executed in the first embodiment for each sampling period, for example, 100 milliseconds.

That is to say, at a step 201, obstacle detection device 5 reads positions of respective objects detected by means of scanning type laser radar 1 in the form of R (Px_$z_o$[i], Py_$z_o$[i]). It is noted that a subscript x denotes a position of each object in a lateral direction (a vehicular width direction), a subscript y denotes a position of each object in a longitudinal direction (a vehicular inter-vehicle distance direction). In addition, a subscript i denotes an integer representing an ID (Identification) number of each detected object and which is equal to or larger than zero, $z_o$ denotes a present value, $z_1$ denotes a past value one sampling period (100 milliseconds) before the present time, and $z_n$ denotes the past value n sampling period(s) before the present time.

Figure 6:
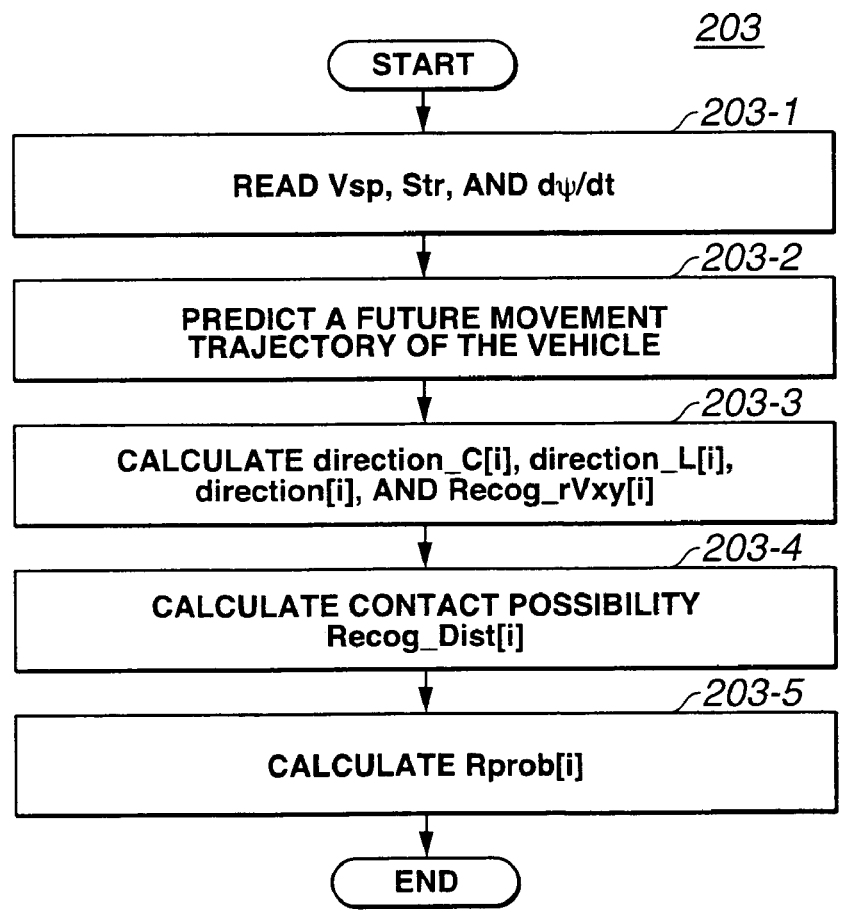
FIG. 6 is a detailed flowchart representing a flow of a noticeable object selection process shown in FIG. 3.

At a step 202, obstacle detection device 5 fetches a result of photographing (an image) at the present sampling period from CCD camera 3. At a step 203, obstacle detection device 5 selects one most noticeable object from among respective objects (each ID number) detected at step 201. A specific flow thereof will be described with reference to a detailed flowchart of FIG. 6. That is to say, at a step 203-1, obstacle detection device 5 reads vehicle speed Vsp of the host vehicle, steering angular displacement Str of the host vehicle, and a yaw rate dψ/dt of the host vehicle (these values being) at the present sampling period.

At a step 203-2, obstacle detection device 5 predicts a future (movement) trajectory (orbit) according to the following equation (1) as a turning radius R of the vehicle using the vehicle speed Vsp, the steering angular displacement Str, and the yaw rate determined at step 203-1.

$$R = Vsp/(d\psi/dt) \text{ (in the case where Vsp>30 Km/h)}$$

$$R = (lf+lr)/Str \text{ (in the case where Vsp} \leq 30 \text{ Km/h)} \quad (1).$$

In equations (1), lf denotes a distance from a front road wheel axle to a weight center and lr denotes a distance from a rear road wheel axle to the weight center.

At a step 203-3, obstacle detection device 5 derives a direction of a relative velocity vector having a highest possibility of contacting with the host vehicle from the positions of the detected objects read at step 201 according to the following equation (2) and a direction of relative velocity vector in a case where the detected object is approached to the host vehicle to be contacted with the host vehicle but very hardly contacted with the host vehicle (namely, a defined boundary of an obstacle judgment) according to the following equation (3), from the positions of the detected objects read at step 201, respectively.

$$\text{direction\_C}[i] = a \tan(Px\_z_o[i]/Py\_z_o[i]) \quad (2)$$

and $$\text{direction\_L}[i] = a \tan((Px\_z_o[i]+W\_z_o[i]/2+w/2)/(Py\_z_o[i])) \quad (3).$$

In equation (3), atan denotes an arc tangent (inverse tangent), W denotes an actual width of object i, and w denotes a width of the host vehicle.

Next, obstacle detection device 5 calculates a direction of a relative velocity vector of each obstacle candidate to the host vehicle from the following equation (4) and calculates a possibility that the detected object can provide an obstacle for the host vehicle from the following equation (5).

$$\text{direction}[i] = a \tan(rVx\_z_o[i]/rVy\_z_o[i]) \quad (4).$$

$$\text{Recog\_}rVxy[i] = (-0.2/\text{abs}(\text{direction\_}L[i]-\text{direction\_}C[i]))*\text{abs}(\text{direction\_}C[i]-\text{direction}[i])+1.0 \quad (5).$$

In equation (5), Recog_rVxy takes a range from 0.8 to 1 when the detected object i has a possibility of the contact with the host vehicle and gives a smaller value as the possibility becomes lower At step 203-4, obstacle detection device 5 determines a possibility of contact between the detected object i and the host vehicle from the following equation (6) from future movement trajectory R of the vehicle calculated at equation (1).

$$\text{Recog\_Dist}[i] = (-0.2/w/2)*\text{abs}(\text{hypot}(Py\_z_o[i], (Px\_z_o[i]-R))-R)+1.0 \quad (6).$$

In equation (6), hypot(p1, p2) denotes an argument (a parameter) to return $(p1*p1+p2*p2)^{0.5}$ and Recog_Dist[i] takes a range from 0.8 to 1 when there is a possibility of contact between the detected object and the host vehicle and gives a smaller value as the possibility becomes lower.

At a step 203-5, obstacle detection device 5 integrates two contact possibilities calculated by the equations (5) and (6) into one contact possibility.

$$\text{Rprob}[i] = \text{func}(Th\_rVy\_L, Th\_rVy\_H, rVy\_z_o[i], \text{Recog\_}rVxy[i], \text{Recog\_Dist}[i]) \quad (7).$$

Figure 7:
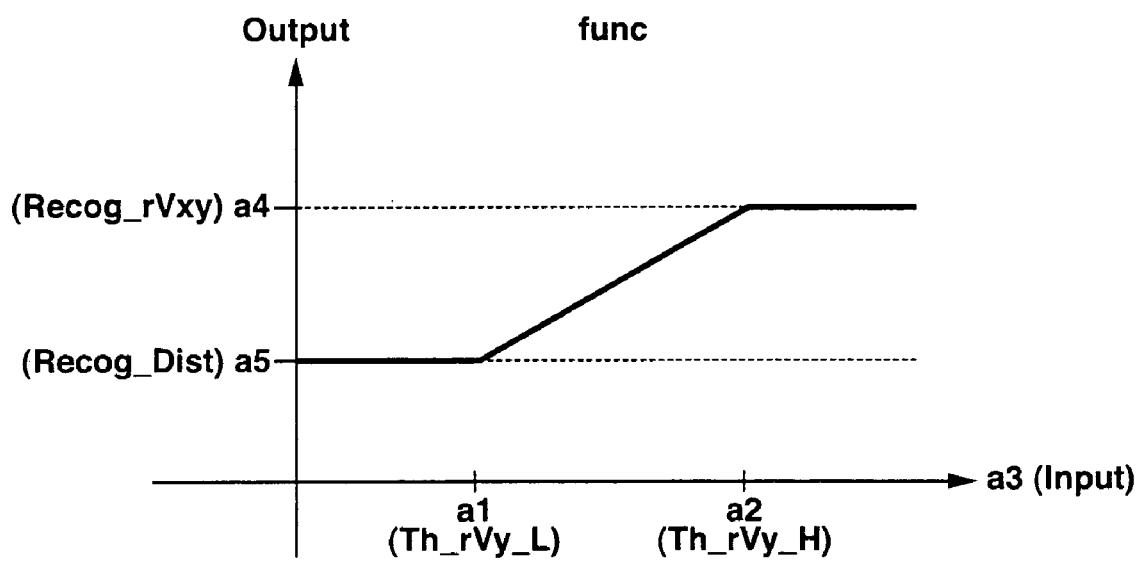
FIG. 7 is a map view representing a characteristic of a function func.

In equation (7), Th_rVy_L and Th_rVy_H denote appropriate threshold values to determine a weight of obstacle determining method. In equation (7), func (a1, a2, a3, a4, a5) denotes a function having a characteristic represented by FIG. 7. When a longitudinal relative velocity shown in FIG. 7 becomes small, a more importance is placed on a calculation result of equation (6). When the longitudinal relative velocity shown in FIG. 7 becomes large, the more importance is placed on a calculation result of equation (5).

After contact possibility Rprob[i] (equation (7)) to the host vehicle for each of the detected objects is calculated, obstacle detection device 5 selects only one object of the highest objects from among the objects corresponding to the calculation results of Rprob[i] for all detected objects which are equal to or higher than a predetermined value, the selected object having the ID number assigned to a flag slct.

If all of Rprob[i] are not equal to or higher than the predetermined value, i.e., no obstacle is present, flag slct is set to −1 (slct=−1).

Referring back to FIG. 3, at step 204, obstacle detection device 5 determines a status of flag slct, the routine goes to a step 220 if slct<0, and the routine goes to a step 205 if slct≧0. At step 205, obstacle detection device 5 checks to see a flag status of IP_Tracking according to whether the object tracking through the image processing is carried out. This flag of IP_Tracking is set to "1" if the object tracking (pursuing) through the image processing is carried out and is reset to "0" if no object tracking through the image processing is carried out. If IP_Tracking is zero (IP_Tracking=0) (No) at step 205, the routine goes to a step 206. If IP_Tracking is one (IP_Tracking=1) (Yes) at step 205, the routine goes to a step 208. At step 206, obstacle detection device 5 carries out an object extraction on an image region based on the position of the object selected at step 203: R(Px_$z_o$[slct], Py_$z_o$[slct]) (called, an initial (or first) extraction process). At a step 207, obstacle detection device 5 carries out a connection of position R (Px_$z_o$[slct], Py_$z_o$[slct]) of the object through laser radar 1 with an edge position of the image and sets the object tracking (pursuing) flag IP_Tracking to "1" (IP_Tracking=1) and the routine goes to a step 210, in a case where the initial extraction process has succeeded at step 206. If the initial extraction process has failed, the object tracking flag (IP_Tracking=0) is left unchanged and the routine goes to step 220.

At step 208, obstacle detection device 5 defines a region for the object tracking process on the basis of the object tracking region through the previous image processing and carries out the object tracking within this region. At a step 209, obstacle detection device 5 calculates a position of an object I(Px_$z_o$, Py_$z_o$) detected through the image processing in a case where the object can be tracked (pursued) through the image processing at step 208. Since, in the image processing, only one object is processed, I(Px_$z_o$, Py_$z_o$) indicates a scalar. Then, with the flag state of IP_Tracking set to "1", the routine goes from step 209 to step 210. In a case where the object tracking (pursuing) through the image processing has failed, the routine goes to a step 220 with the flag state of IP_Tracking reset to "0" (IP_Tracking=0), the routine goes to step 220.

At step 210, obstacle detection device 5 calculates a possibility Iprob that the object detected through the image processing provides the obstacle for the host vehicle. A specific method of the calculation of the possibility has been described at step 203. It is noted that this possibility Iprob is calculated not on the basis of the determination based on the relative velocity vector but on the basis of the position of the detected object and the predicted course of movement (trajectory) of the host vehicle (namely, from Recog_Dist not from Recog_rVxy). This is because a lateral directional position calculated through the image processing indicates a high accuracy but a longitudinal directional position indicates a low accuracy so that the relative velocity requiring a differential calculation cannot clearly be obtained.

At a step 211, obstacle detection device 5 determines whether the object detected through the image processing is the same object detected through laser radar 1 and selected at step 203. Specifically, if, for example, both of the following equations (8) and (9) are satisfied, obstacle detection device 5 determines that the object detected through the image processing is the same object detected through laser radar 1. At step 211, if both of the detected objects through the laser radar 1 and through the image processing are mutually the same (Yes) at step 211, the routine goes to step 220. If not (No) at step 211, the routine goes to a step 212.

$$\text{abs}\{R(Px\_z_o[slct])-I(Px\_z_o)\}<Th\_Px1 \quad (8).$$

$$\text{abs}\{R(Py\_z_o[slct])-I(Py\_z_o)\}<Th\_Py1 \quad (9).$$

It is noted that abs(A) is a function to output an absolute value of A (A is a head character of an argument), Th_Px1 denotes a threshold value related to a variation in the detected position in the lateral direction, and Th_Py1 denotes a threshold value related to the detected position in the longitudinal direction. In other words, in a case where the position detected through laser radar 1 is separated from the detected position through the image processing by a predetermined value, it means that mutually different objects are being detected through laser radar 1 and through the image processing.

At step 211, such a case where the detected objects through laser radar 1 and through the image processing are determined to be mutually the same object according to the positional separation by the threshold values described above has been carried out. However, in the same way as an object change in the detected object through laser radar 1 occurs, the mutually different objects are determined to be detected. As an example of this determination, obstacle detection device 5 may determine that the object change in the detected object through laser radar 1 occurs when both equations of (10) and (11) are satisfied at step 211 and the routine may go to step 212.

$$\text{abs}\{R(Px\_z_o[slct])-R(Px\_z_1[slct])\}>Th\_Px2 \quad (10).$$

$$\text{abs}\{R(Py\_z_o[slct])-R(Py\_z_1[slct])\}>Th\_Py2 \quad (11).$$

In details, both of Th_Px2 and Th_Py2 represent allowance values related to the movement of the object at a time between the previous and the present sampling periods. In details, if the object to be most noticeable through laser radar 1 at the previous and the present sampling periods is not left changed (no change in the object occurs), left sides of above equations (10) and (11) give relatively small values so as to determine the object change.

At a step 212, the routine goes to a step 213 if both of the following equations of (12) and (13) are satisfied from Iprob and Rprob[slct]. If not satisfied (No) at step 212, the routine goes to a step 214.

$$\text{Prob}[slct]<Th\_Prob1 \quad (12).$$

$$\text{Iprob}<Th\_Prob1 \quad (13).$$

It is noted that Th_prob1 means a small value to such a degree that obstacle detection device can assure that the object does not provide the obstacle for the host vehicle. At step 213, object tracking flag IP_Tracking is reset to "0" and the object tracking is forcibly ended. Then, the first extraction process is carried out at the subsequent image processing on the basis of the position R (Pz_$z_o$[slct], Py_$z_o$[slct]) of the laser radar detected object at step 206 so that such an advantage derived from such a feature that when both of the first importance as obstacle and the second importance as obstacle are lower that a predetermined value, the selected object is further selected can be achieved Then, the routine goes from step 213 to step 220.

Then, at a step 214, obstacle detection device 5 determines whether both of Iprob and Rprob[slct] satisfy both conditions described in equations (14) and (15). If both conditions are satisfied (Yes) at step 214, the routine goes to a step 215. If not satisfied (No) at step 214, the routine goes to a step 215.

$$Rprob[slct] > Th\_Prob2 \quad (14)$$

$$Iprob > Th\_Prob2 \quad (15)$$

In conditions (14) and (15), Th_Prob2 means a large value to a degree such as obstacle detection device 5 can assure the obstacle. At step 215, object tracking flag IP_Tracking is set to "1" At step 215, object tracking flag is set to "1" (IP_Tracking=1). Since, according to this step, the object tracking process is continued on the basis of the position I(Px_$z_o$, Py_$z_o$) of the object tracked through the image processing at step 208 at the subsequent image processing, an advantage derived from such a feature that when both of the first importance as obstacle and the second importance as obstacle are higher than the corresponding predetermined value, the object under the tracking is selected can be achieved. Then, the routine goes from step 215 to step 220.

At step 216, obstacle detection device 5 determines whether the following inequality (16) is satisfied. If the following inequality (16) is satisfied (Yes) at step 216, the routine goes to a step 217. If not satisfied (No), the routine goes to a step 218.

$$Prob[slct] < Iprob \quad (16).$$

At step 217, object tracking flag is rested at 1 (IP_Tracking=1). Since, at this step, the object tracking (pursuing) process is continued on the basis of the position I(Px_$z_o$, Py_$z_o$) of the object under the tracking through the image processing at step 208 at the next image processing, an advantage derived from the feature such that when the second importance as obstacle is higher than the first importance as obstacle, the object under the tracking is selected can be achieved. Then, the routine goes from step 217 to step 220.

At step 208, obstacle detection device 5 advances to a step 219 if the following inequality (17) is satisfied. If not satisfied, the routine goes to step 220.

$$Prob\ [slct] > Iprob \quad (17)$$

At step 219, object tracking flag IP_Tracking is reset with TPO_Tracking=0 Since the first extraction process based on the position R (Px_$z_o$[slct], Py_$z_o$[slct]) is carried out, the advantage derived from such a feature that when the second importance as obstacle is lower than the first importance as obstacle, the selected object is selected can be achieved. Then, the routine goes from step 219 to step 220.

At step 220, obstacle detection device 5 updates the past values for the variables used for calculations of the importance as obstacle and the routine is ended.

As described above, in a case where the object detected through the laser radar and the object tracking through the image processing are different, the tracking process through the image processing is controlled according to the conditions of steps 212 and 219. Thus, even if the system in which the number of objects to be enabled to be image processed is only one, in a case where the plurality of objects are present in the forward detection zone, it becomes possible to carry out the image processing on the appropriate object according to the situation and it becomes possible to achieve a actual processor structure for an world recognition system having a high reliability due to a fusion.

Next, advantages of the obstacle detection apparatus in the first embodiment will be described below. That is to say, in a case where the object detected through image processing unit 4 is determined to be not the same object as detected and selected through laser radar unit 2, the object to be tracked is switched in accordance with a relationship between the highest contact possibility Rprob[slct] from among the object group detected by laser radar 1 and the possibility Iprob which provides the object detected by image processing unit 4, the object requiring the most attention to be paid for the host vehicle can always be selected. Hence, image processing region can be limited to one object so that the calculation load to the image processing can be reduced.

In a case where Rprob[slct] is smaller than Iprob, to continue the tracking of the image of the object, such an object as to be present out of an angle of field of view of laser radar but as to be required to pay the attention due to an execessive approach of the object to the host vehicle cannot be lost.

In a case where Rprob[slct] is larger than Th_Prob, the tracking to the object through the image processing is forcibly ended and the radar detected object is again detected (re-detected) at the initial extraction processing. Hence, at the appropriate timing, the same object as the radar can redundantly be detected so that the reliability of the appratus can be increased.

If both of Rprob[slct] and Iprob are smaller than Th_prob1, the tracking of the image of the object is forcibly and the radar detected object is again detected through the initial extraction process. Hence, the object to be image processed is switched to the radar detected object so that the earlier preparation for an object to become in the future obstacle can be carried out. In general, the camera has a wider angle of field of view than laser radar so that, such a scenery wherein the radar is detecting the object which is remote in the inter-vehicle distance direction but the image processing detects the object which is remote in the lateral direction (vehicular width) direction and immediate before the passing through the object by the avoidance of the steering of the host vehicle.

If both of Rprob[slct] and Iprob are larger than Th_Prob1, the tracking of the object through the image processing is continued. Hence, such a system configuration that the attention is paid to both of the undetected object due to the out of radar angle of field view and the object under the tracking through the radar can be achieved. FIG. 8 shows a table on an action and advantage of the image processing in a case where the laser radar detected object and the detected object through the image processing are mutually different.

Second Embodiment

A second preferred embodiment of the object recognizing apparatus according to the present invention will be described below. In the first embodiment, the object to be image processed is appropriately selected according to the situation in a case where the radar detected object is different from the object detected through the image processing. However, in the second embodiment, the control of the tracking process (pursuing process) through the image processing is executed in a case where the laser detected object is the same the object detected through the image processing so as to correspond to a low positional accuracy of the image processing. Since the structure of the second embodiment is the same as that of the first embodiment shown in FIG. 2, the detailed description thereof will herein be omitted. Next, the operation of the second embodiment will be described below.

Figure 9:
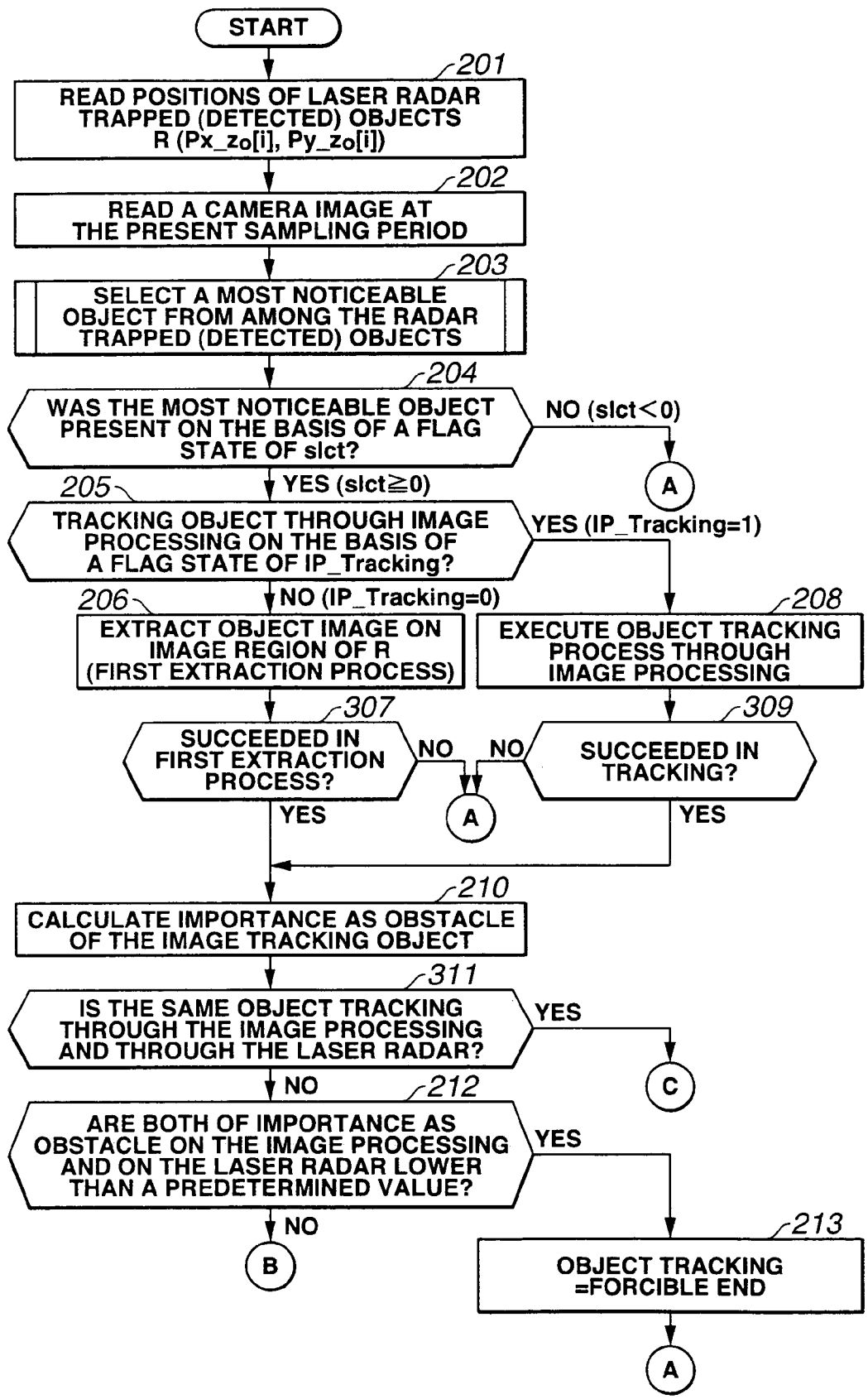
FIG. 9 is a flowchart representing the tracking object selective control process executed in a second preferred embodiment of the obstacle detection apparatus according to the present invention.
Figure 10:
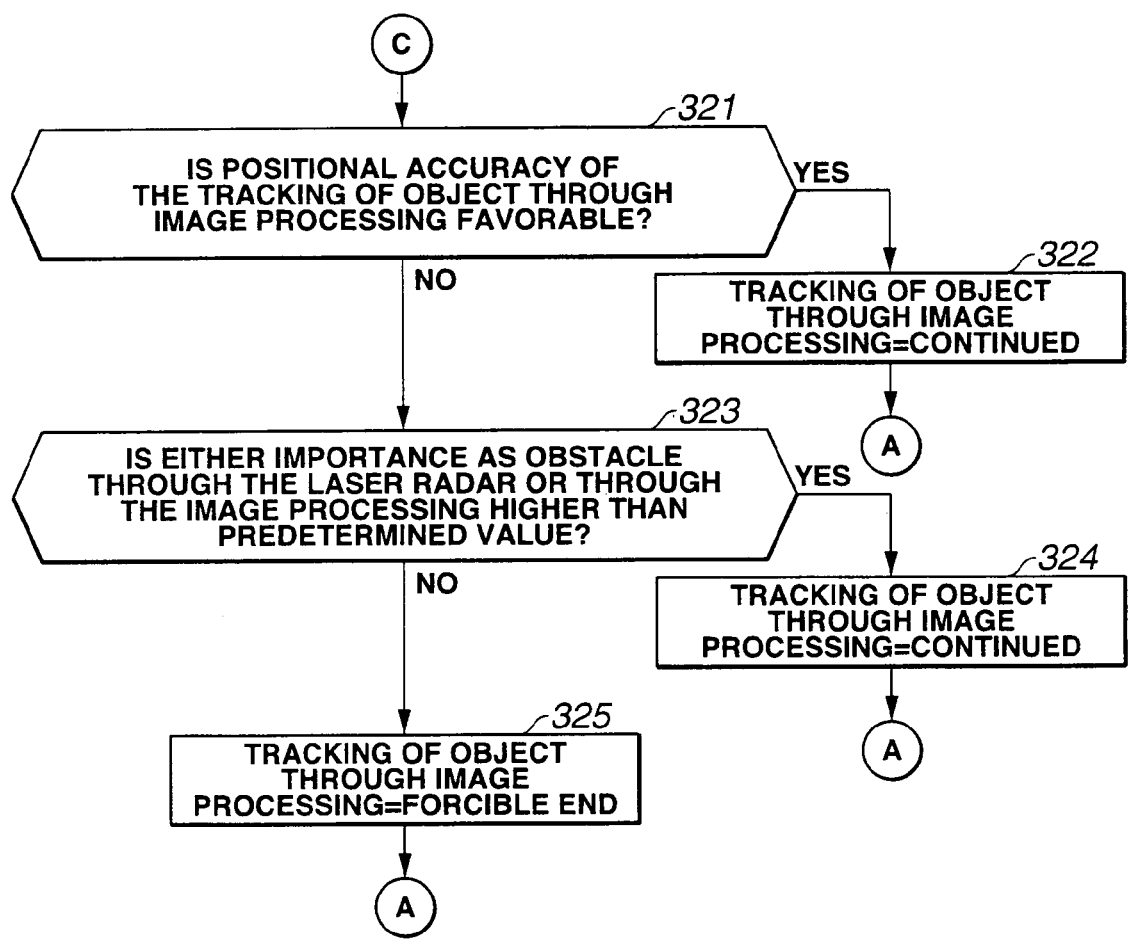
FIG. 10 is a flowchart representing the flow of the tracking object selective control process executed in the second preferred embodiment of the obstacle detection apparatus according to the present invention.
Figure 12:
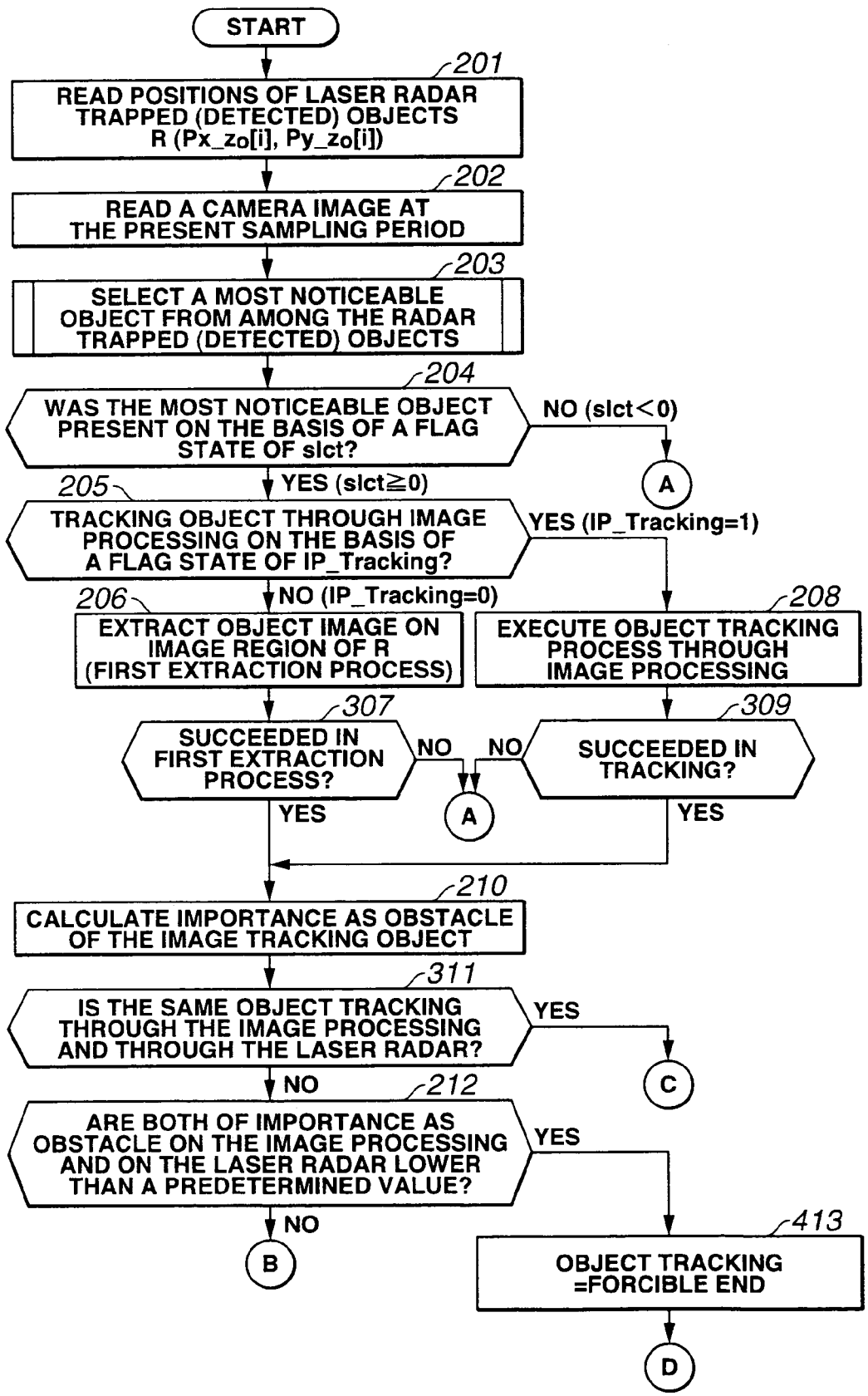
FIG. 12 is a flowchart representing the flow of the tracking object selective control process executed in a third preferred embodiment of the obstacle detection apparatus according to the present invention.
Figure 13:
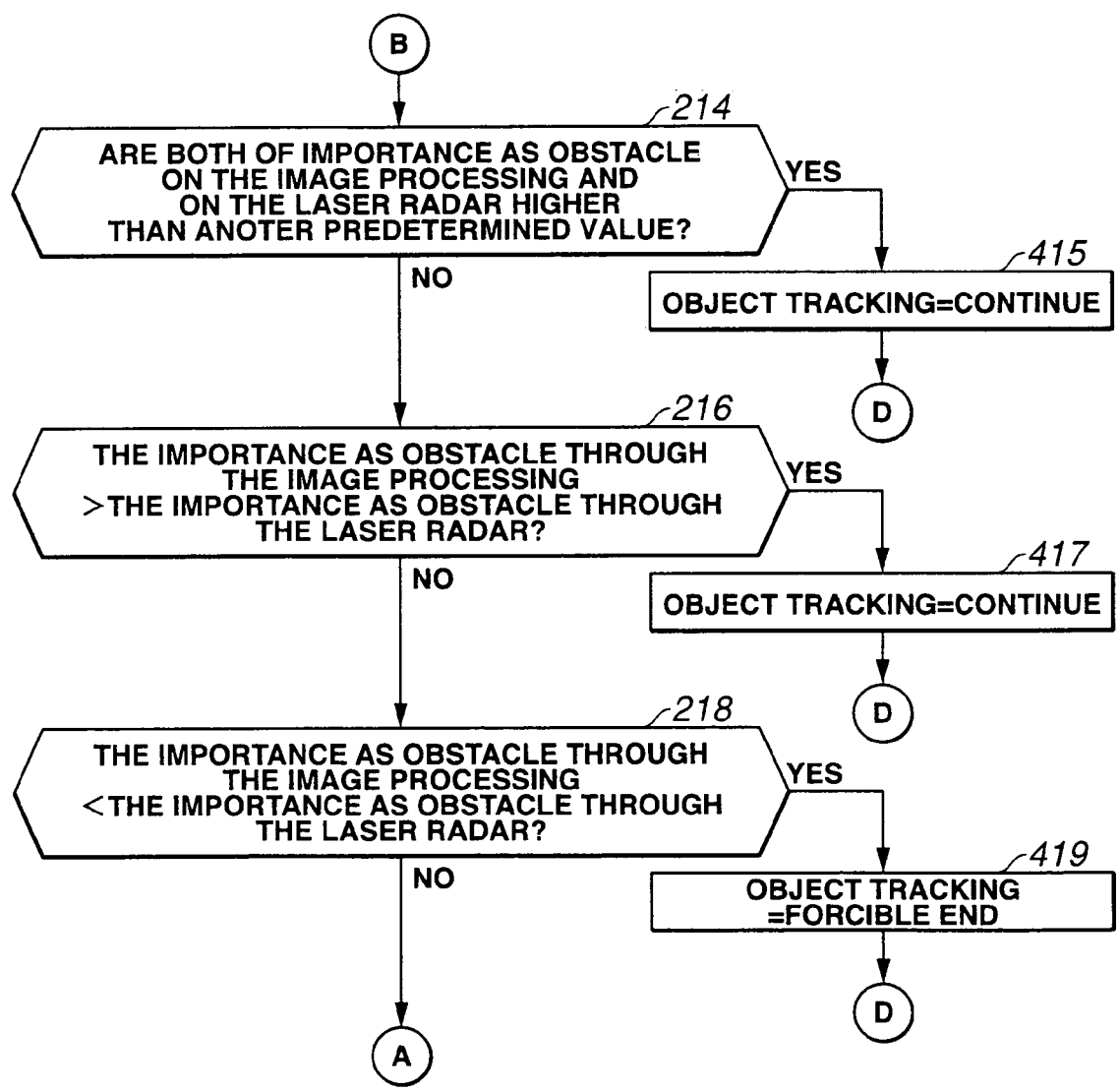
FIG. 13 is a flowchart representing the flow of the tracking object selective control connected with FIG. 12 and executed in the third embodiment of the obstacle detection apparatus according to the present invention.
Figure 14:
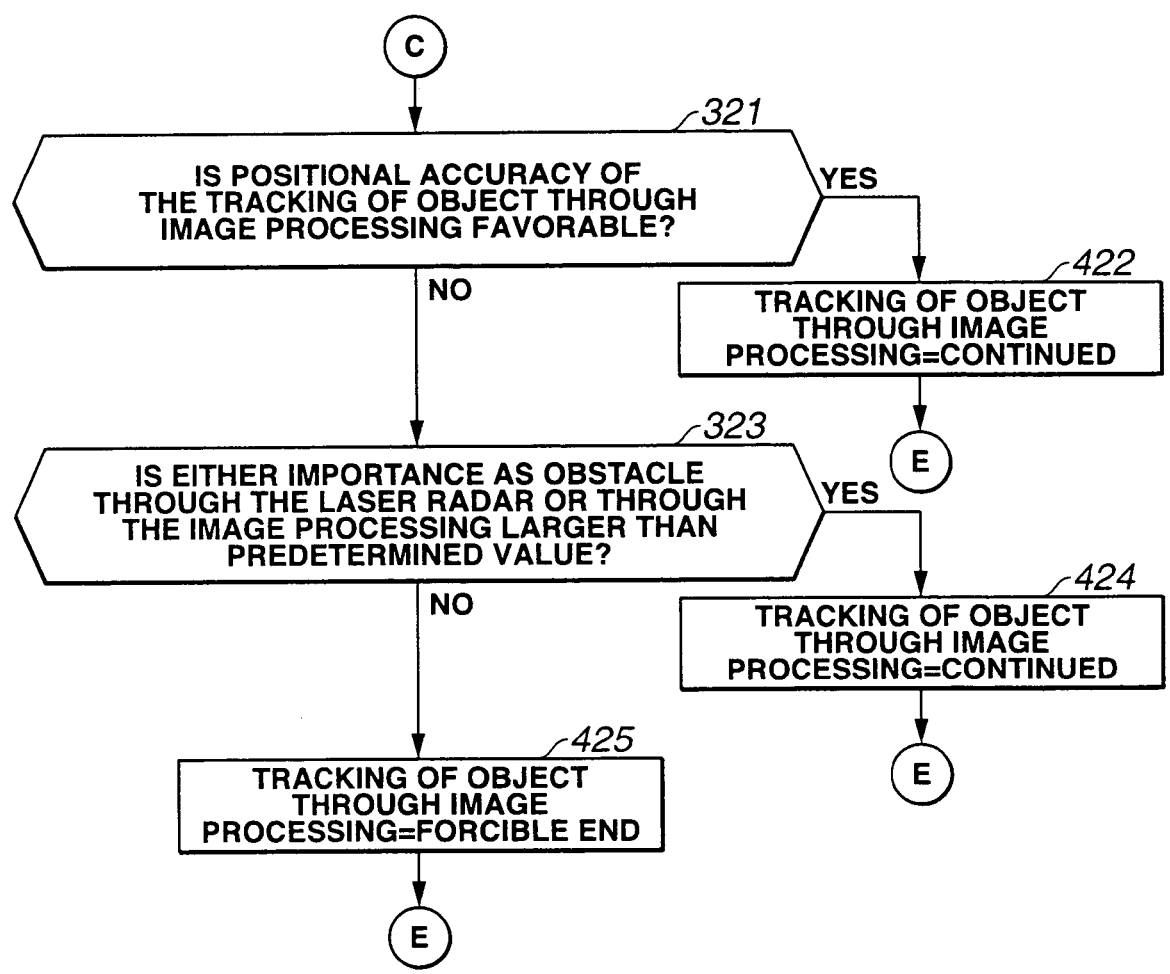
FIG. 14 is a flowchart representing the flow of the tracking object selective control connected with FIGS. 12 and 13 and executed in the third embodiment of the obstacle detection apparatus according to the present invention.
Figure 15:
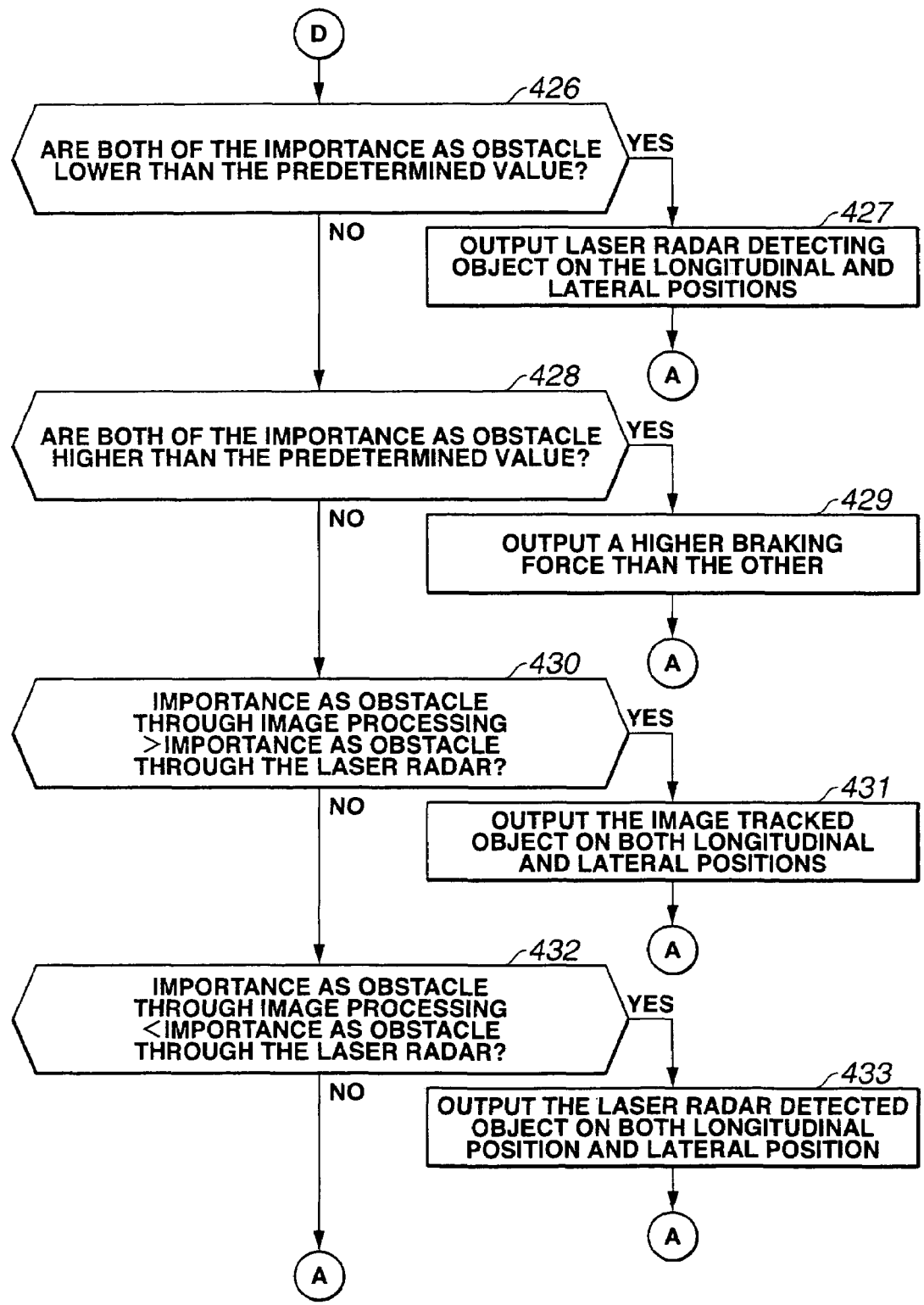
FIG. 15 is a flowchart representing the flow of the tracking object selective control process connected with FIGS. 13 and 14 and executed in the third embodiment of the obstacle detection apparatus according to the present invention.
Figure 16:
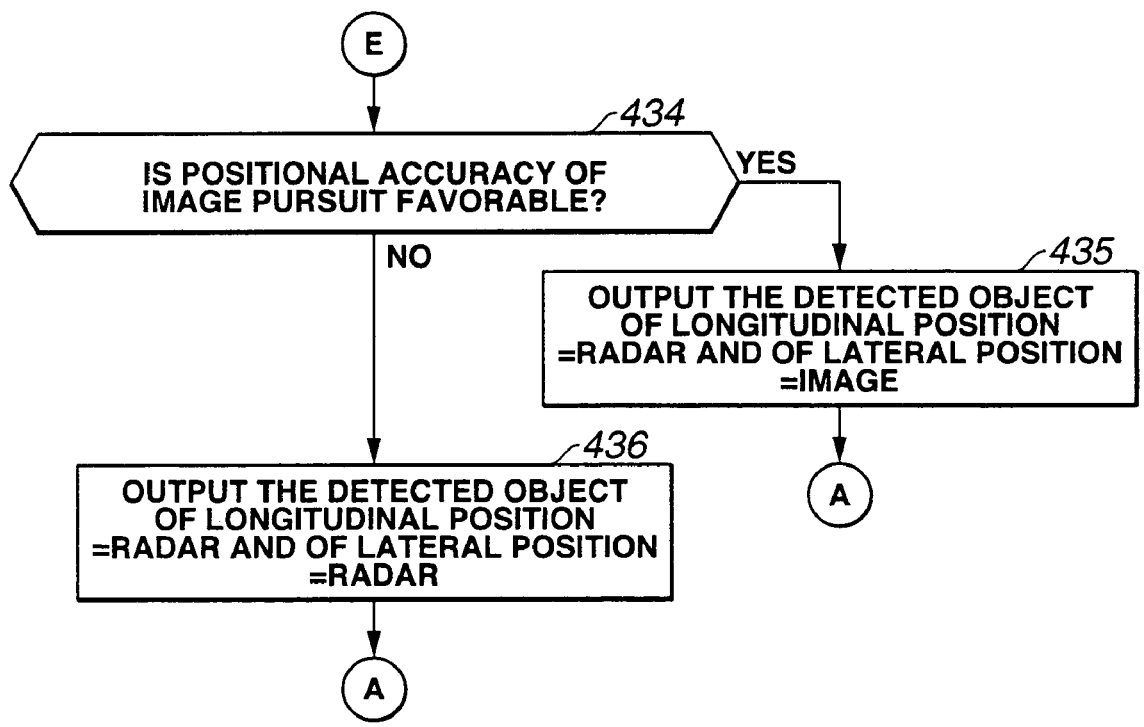
FIG. 16 is a flowchart representing the flow of the tracking object selective control process connected with FIGS. 13, 14, and 15 and executed in the third embodiment of the obstacle detection apparatus according to the present invention.

[Tracking object selection control process] FIGS. 9 and 10 are integrally a flowchart representing the flow of the tracking object selection control process. It is noted that the same step numbers as the first embodiment shown in FIGS. 3, 4, and 5.

At a step 307, the contents thereof are generally the same as step 207 in the case of the first embodiment. However, in addition to this, obstacle detection device 5 sets a flag IP_State representing that the image processing is being carried out with a high accuracy (IP_State flag=1). If IP_State is zeroed (IP_State flag=0), the object tracking through the image processing can be carried out but the positional accuracy of the detected object is not so high. At a step 309, the contents thereof are generally the same as step 209 in the case of the first embodiment. However, in addition to this, obstacle detection device 5 checks the positional accuracy at the tracking through the image processing if object tracking flag is set as IP_Tracking=1. If the position accuracy is high, flag IP_State is set to "1" (IP_State=1). If the position accuracy is low although the object tracking through the image processing can be carried out, flag IP_State is reset to "0" (IP_State=0). As a specific method, in a case where the object is detected through an edge detection method, flag IP_State is set (IP_State=1). On the other hand, in a case where the object is detected through a pattern matching method, flag IP_State is reset (IP_State=0). The contents of a step 311 are generally the same as step 211 in the first embodiment. In addition, the difference point is that if the same object detected through the image processing as the radar detected object occurs, the routine goes to step 220 and the present control procedure is ended. In the second embodiment, in this case, the routine goes to a step 321. At step 321, the routine goes to a step 322 if the following condition (18) is satisfied. If not satisfied (No) at step 321, the routine goes to a step 323.

$$IP\_State=1 \quad (18)$$

At a step 322, object tracking flag IP_Tracking is set to "1" (IP_Tracking=1). According to this process, at the next image processing, the tracking process is continued on the basis of position I(Px_$z_o$, Py_$z_o$) of the image tracking object at step 308 and, then, the routine goes to a step 320. At a step 323, the routine goes to a step 324 if equation (14) is satisfied. If not satisfied (No) at step 323, the routine goes to a step 325. It is noted that the inequality of (14) is used at step 323 but a new threshold value may be used and although the importance as obstacle on the radar is used, the importance as obstacle on the image processing Iprob may be used.

At a step 324, object tracking flag is set as IP_Tracking=1. According to this process, at the next image processing, the tracking process is continued on the basis of position I(Px_$z_o$, Py_$z_o$) of the image processing detected object at step 208. Thus, the advantage derived from such a feature that, when the reliability of the image processing is determined to be high, the object under the tracking is selected and, when the reliability of the image processing is determined to be low, the object under tracking is selected if at least one of the first importance as obstacle and the second importance as obstacle is higher than a predetermined value. Then, the routine goes to step 220.

At a step 325, object tracking flag is reset to IP_Tracking is reset as IP_Tracking=0. Thus, at the next image processing, the first (initial) extraction process is carried out on the basis of position R(Px_$z_o$[slct], Py_$z_o$[slct]) of the radar detected object at step 206. Hence, the advantage derived from the feature such that, when the reliability of the image processing is high, the object under the tracking is selected, and when the reliability of the image processing is determined to be low, the selected object is selected in a case where at least one of the first and second importance as obstacle is lower than a predetermined value can be achieved. Then, the routine goes to step 220.

As described above, in a case where the radar detected object is the same as the tracking object through the image processing, obstacle detection device 5 controls the continuation and forcible end of the tracking process in accordance with a height of a possibility that the detected object becomes the obstacle and the positional accuracy of the object tracking through the image processing in a case where the radar detected object is the same as the tracking object This causes the higher priority to be taken to the redundant detection of the tracking object or improvement in the positional accuracy in accordance with the traveling situation in a case where the tracking positional accuracy at the image processing is low. And this becomes possible to cope with the above priority. Thus, the improvements in the reliability and positional accuracy according to the fusion can be achieved. Next, the advantages in the second embodiment will be described below.

In a case where the object detected through the image processing is the same as that detected through laser radar 1, the object to be tracked is switched in accordance with a relationship from among the positional accuracy through image processing, highest contact possibility Rprob[slct] from among the object group detected by means of laser radar 1, and possibility Iprob that the detected object through image processing unit 4 provide the obstacles for the host vehicle. That is to say, when the reliability of the image processing is low in a case where the detected object does not provide the obstacle for the time being, the tracking process is once forcibly ended, and the image processing is retried initially from the first so that a highly accurate positional detection can be carried out through the image of the object. This permits a preparation for a future obstacle. In addition, in a case where the detected object is the obstacle, the reliability of the image processing is low, the positional accuracy of the object calculated from the image is more or less reduced, a redundant object detection system with the radar can be constructed by deriving the obstacle position which is always continuous. It becomes possible to back up the radar which has the possibility of loss at a short distance due to the accuracy of the field of view.

Even in a case wherein the positional accuracy of the object tracking through the image processing is determined to be low, the tracking of the image of the object is continued when the importance as obstacle of radar Rprob[slct] is larger than predetermined value of Th_Prob2. Hence, the positional accuracy of the object calculated from the image is more or less reduced. A redundant object detection system with the radar can be constructed since the position of the obstacle is always continuously determined. Due to a narrow filed of view, it becomes possible to back up the radar which may lose the object at a short distance, In a case where the positional accuracy of the object tracking through the image processing is determined to be low and importance as obstacle Rprob[slct] of the radar is equal to or lower than predetermined value Th_Prob2, the tracking of object through the image processing is once forcibly ended and the object which has been tracked (pursued) through the image processing=radar detected object is re-tried from the initial image processing. That is to say, in a case where the reliability is reduced due to a more or less inclusion of a background on the image region of the tracked object on the image region of the tracked object during the tracking through the image processing, the image processing is retried from the first so that the background can again be eliminated. Thus, the highly accurate positional detection can be prepred from the image in a case where the object becomes the obstacle in the future. FIG. 11 shows the action and advantages of the obstacle detection apparatus in the second embodiment when the laser detected object is the same as the detected object through the image processing.

Third Embodiment

The obstacle detection apparatus in a third preferred embodiment will be described below. In each of first and second embodiments, the object to be image processed is limited and the tracking process is controlled. However, in the third embodiment, in addition to this, the position of the object to be outputted to a later stage (a control system, a warning system, or automatic brake controller 8) can simply become highly accurate and an appropriate object is selected and outputted. Since the structure of the obstacle detection apparatus in the third embodiment is generally the same as in the first embodiment, the detailed description thereof will herein be omitted. Next, the operation of the obstacle detection apparatus in the third embodiment will be described below with reference to an integral flowchart of FIGS. 12 through 16. It is noted that the description on the same contents as the same steps in the case of the first and second embodiments will herein be omitted.

That is to say, at steps 413, 419, and 425, object tracking flag is reset as follows: IP_Tracking=0 and the routine goes to a step 426. It is noted that, in the case of step 425, the routine goes to a step 434. At steps 415, 417, 422, and 424, object tracking flag is set as follows: IP_Tracking=1 and the routine goes to step 426. It is noted that in the case of steps 422 and 424, the routine goes to step 434. At step 426, the routine goes to a step 427 if both conditions of (12) and (13) are satisfied. If not satisfied (No) at step 426, the routine goes to a step 428. At step 427, obstacle detection device 5 outputs the longitudinal and lateral positions, i.e., the radar detected position R(Px_$z_o$, Py_$z_o$[slct]) to the later stage and the routine goes to step 220.

At step 428, the routine goes to a step 429 if both of equations (14) and (15) described above are satisfied. If not (No) at step 428, the routine goes to a step 430. At step 429, obstacle detection device 5 calculates a target deceleration to reduce a collision speed from the following equation (19) and determines the present brake torque and a brake pressure from the following equation (20). These brake torque and brake pressure are compared with the object detected through the radar and the object detected through the image processing and obstacle detection device 5 outputs an object position requiring a strong driving force to the later stage and the routine goes to step 220.

$$\alpha_{CA}=(Vp^2-Vc^2)/\{2(L-Lt)\} \quad (19),$$

wherein Vp=Vc+Vr $$Tbrk=Tw-Rt \text{ Rat Rdef}(Te-Je \, dNe) \quad (20)$$

wherein Tw=Mv●$\alpha_{CA}$●Rw.

In equation (19), $\alpha_{CA}$ denotes the target deceleration, Vc denotes the vehicle speed of the host vehicle, Vr denotes a relative speed with respect to the object, L denotes a distance from the host vehicle to the object, and Lt denotes a target inter-vehicle distance. In equation (20), Tbrk denotes a brake torque, Tw denotes a drive axle torque, Rt denotes a torque ratio derived from a speed ratio between the input and output axle of a torque converter, Rat denotes a shift gear ratio of an automatic transmission (AT), Rdef denotes a differential gear ratio, Ne denotes an engine speed to be measured, dN denotes a time differential value of the engine speed, Te denotes an engine brake torque determined by Ne, Je denotes an engine inertia, Mv denotes a weight of the host vehicle, and Rw denotes a radius of a road wheel.

At step 430, if equation (16) is satisfied, the routine goes to a step 431. If not so (No) at step 431, the routine goes to a step 432. At step 431, obstacle detection device 5 outputs the lateral position and longitudinal position, namely, the position of the detected object through the image processing I (Px_$z_o$, Py_$z_o$) to the later stage and the routine goes to step 220.

At step 432, the routine goes to step 433 if the equation (17) is satisfied. If not satisfied, the routine goes to step 220. At step 433, obstacle detection device 5 outputs the longitudinal and lateral positions, namely, the position of the radar detected object R (Px_$z_o$[slct], Py_$z_o$[slct]) to the later stage and the routine goes to step 220. At a step 434, if equation (18) is satisfied, the routine goes to a step 435. If not satisfied (No) at step 434, the routine goes to a step 436. At 435, obstacle detection device 5 outputs the longitudinal position of the radar detected position R(Py_$z_o$[slct]) and the lateral position of the object detected through the image processing I(Px_$z_o$) to the later stage and the routine goes to step 220. At step 436, obstacle detection device 5 outputs the longitudinal and lateral positions which are the position of the radar detected object R(Px_$z_o$[slct], Py_$z_o$[slct]) to the later stage and the routine goes to step 220.

As described above, on the basis of whether the radar detected object is the same as the object detected through the image processing, the importance as obstacle, and the reliability of the image processing, the position of the object is selected and outputted to the later stage. Hence, the output position to the later stage can be highly accurate positioning in a simple construction. In addition, it becomes possible to output when the appropriate object is selected. Next, the advantages of the third embodiment will be described below.

Since the position of the object to be outputted to the later stage is selectively determined on the basis of the positional accuracy through the image processing, the highest contact possibility Rprob[slct] from among the detected object group through laser radar 1, and the possibility Iprob that the detected object through image processing unit 4 provides the obstacle for the host vehicle, the position outputted to the later stage can simply become highly accurate.

In a case where both of the radar and image processing are determined to be tracking (pursuing) the same object, such a selection of the position output to the later stage that the longitudinal direction (inter-vehicle distance direction) is the radar output and the lateral direction (vehicular width direction) is the output of the detected object through the image processing is made. In a case where the reliability of the image processing is low, such a selection of the position output to the later stage that, in both longitudinal and lateral directions, the radar outputs are selected. Hence, the position to be outputted to the later stage can simply become highly accurate. In a case where both of the radar and the image processing are determined not to be tracking the same object, both of the longitudinal and lateral directions which correspond to the position of the detected object through the image processing are outputted to the later stage in a case where Prob[slct] is smaller than Iprob. If Rprob[slct] is larger than Iprob, in both longitudinal and lateral directions, the position of the radar detected object is outputted to the later stage. On the other hand, if both of Rprob[slct] and Iprob are smaller than predetermined value Th_Prob1, both of the longitudinal direction and lateral direction of the position of the radar detected object are outputted to the later stage. Thus, the position to be outputted to the later stage can appropriately be selected according to a situation.

In a case where the radar and the image processing are determined not to be tracking (pursuing) the same object, obstacle detection device 5 calculates the target deceleration to reduce the collision speed in a case where both of Rprob[slct] and Iprob are larger than predetermined value Th_Prob1 and derives the instantaneous brake torque and brake pressure. Then, obstacle detection device 5 comprises them with the radar detected object and the detected object through the image processing. Then, the position of one of the objects which requires a larger braking force is selectively outputted to the later stage. Hence, in a case where both of the objects which is under the detection through the radar and which cannot be detected due to the outside position to the field of view are the obstacles, a more appropriate position of one of the objects for the host vehicle can be outputted to the later stage.

FIG. 17 shows conditions for the position of the detected object to the later stage and their advantages.

The entire contents of a Japanese Patent Application No. 2003-189615 (filed in Japan on Jul. 1, 2003) are herein incorporated by reference. The scope of the invention is defined with reference to the following claims.

What is claimed is:

1. An obstacle detection apparatus for an automotive vehicle, comprising:
    an object position detecting section that detects a position of each object located in a forward detection zone of the vehicle;
    an image fetching section that fetches a situation of the forward detection zone in a form of an image;
    a noticeable object selecting section that selects only one of most noticeable objects for the vehicle on the basis of the detected position of each object;
    an image processing object tracking section that tracks the selected object of the noticeable object selecting section through an image processing for the fetched image;
    a first importance as obstacle calculating section that calculates a first importance as an obstacle, wherein the first importance represents a possibility that the selected object becomes an obstacle for the vehicle on the basis of an output result of the object position detecting section;
    a second importance as obstacle calculating section that calculates a second importance as an obstacle, wherein the second importance represents a possibility that the tracked object becomes the obstacle for the vehicle on the basis of an output result of the image fetching section;
    a same object determining section that determines whether the selected object of the noticeable object selecting section is the same as the tracked object of the image processing object tracking section;
    an image processing reliability outputting section that outputs a reliability of a processing state of the image processing object tracking section; and
    a tracking object selecting section that selects the object for the image processing object tracking section based on the first importance, the second importance, and the reliability when the same object determining section determines that the selected object is the same as the tracked object and selects the object for the image processing object tracking section based on the first importance and the second importance when the same object determining section determines that the selected object is different from the tracked object.

2. An obstacle detection apparatus for an automotive vehicle as claimed in claim 1, the obstacle detection apparatus further comprises an output object position determining section that selectively determines a position of the object to be outputted to a later stage on the basis of at least two of the first importance as obstacle, the second importance as obstacle, the reliability, and a result of determination by the same object determining section.

3. An obstacle detection apparatus for an automotive vehicle as claimed in claim 1, wherein the tracking object selecting section selects the object for the image processing object tracking section when the second importance as obstacle is higher than the first importance as obstacle.

4. An obstacle detection apparatus for an automotive vehicle as claimed in claim 1, wherein the tracking object selecting section selects the object selected by the noticeable object selecting section when the first importance as obstacle is higher than the second importance as obstacle.

5. An obstacle detection apparatus for an automotive vehicle as claimed in claim 1, wherein the tracking object selecting section selects the selected object by the noticeable object selecting section when both of the first importance as obstacle and the second importance as obstacle are lower than a predetermined value.

6. An obstacle detection apparatus for an automotive vehicle as claimed in claim 1, wherein the tracking object selecting section selects the tracked object of the image processing object tracking section when both of the first importance as obstacle and the second importance as obstacle are higher than a predetermined value.

7. An obstacle detection apparatus for an automotive vehicle as claimed in claim 1, wherein the tracking object selecting section selects the tracked object of the image processing object tracking section when the reliability is determined to be higher than a predetermined high value and when at least one of the first and second importance as obstacle is higher than a predetermined value in a case where the reliability is determined to be lower than the predetermined high value.

8. An obstacle detection apparatus for an automotive vehicle as claimed in claim 1, wherein the tracking object selecting section selects the tracked object of the image processing object tracking section when the reliability is determined to be higher than a predetermined value and selects the selected object by the noticeable object selecting section when at least one of the first importance as obstacle and the second importance as obstacle is lower than a predetermined value in a case wherein the reliability is determined to be lower than the predetermined value.

9. An obstacle detection apparatus for an automotive vehicle as claimed in claim 2, wherein the output object position determining section determines a longitudinal position of the selected object and a lateral position of the tracked object as the position of the object when the selected object is determined to be the same as the tracked object and the output object position determining section determines the longitudinal position and the lateral position of the selected object as the position of the object when the reliability is determined to be lower than a predetermined low value.

10. An obstacle detection apparatus for an automotive vehicle as claimed in claim 2, wherein the output object position determining section determines a longitudinal position of the tracked object and a lateral position thereof as the position of the object when the selected object is determined to be different from the tracked object and when the first importance as obstacle is lower than the second importance as obstacle, determines the longitudinal position of the selected object and the lateral position thereof as the position of the object when the selected object is determined to be different from the tracked object and when the first importance as obstacle is higher than the second importance as obstacle and determines the longitudinal position of the selected object and the lateral position thereof as the position of the object when the selected object is determined not to be the same object as the tracked object and when the first importance as obstacle is lower than the second importance as obstacle and both of the first importance as obstacle and the second importance as obstacle are lower than a predetermined value.

11. An obstacle detection apparatus for an automotive vehicle as claimed in claim 2, wherein the output object position determining section, when the selected object is determined to be different from the tracked object, calculates a braking force of the vehicle required for each of the selected object and the tracked object and determines a larger required braking force as the position of the object when the first importance as obstacle is higher than the second importance as obstacle and both of the first importance as obstacle and the second importance as obstacle are higher than a predetermined value.

12. An obstacle detection apparatus for an automotive vehicle as claimed in claim 1, wherein the first importance as obstacle calculating section calculates the first importance as obstacle from the following equation:

$$Rprob[i]=func(Th\_rVy\_L, Th\_rVy\_H, rVy\_zo[i], Recog\_rVxy[i], Recog\_Dist[i]),$$

wherein func(a1, a2, a3, a4, a5) is a function such that as a3 becomes larger than a1 and a2, a more importance is placed on a4 than a5 and, as a3 becomes smaller than a1 and a2, the more importance is placed on a5 than a4, and Th_rVy_L and Th_rVy_H denote predetermined low and high threshold values on a relative velocity of the object of i with respect to the vehicle, rVy_zo[i] is derived from direction[i]=atan (rVx_zo[i]/rVy_zo[i]), wherein atan denotes an arc tangent, Recog_rVxy[i]=(0.2/abs(direction_L[i]−direction_C[i])) *abs(direction _C[i]−direction[i])+1.0, wherein direction_L [i]=atan((Px_z$_0$[i]−W_z$_0$[i]/2+w/2)/(Py_z$_0$[i])), wherein Px_z$_0$[i]Py_z$_0$[i]denotes a position of the object of [i], and direction_C [i]=atan(Px_z$_0$[i]/Py_z$_0$[i]), Recog_Dist[i]=(−0.2/w/2)*abs (hypot(Py_zo[i]−R)−R)+1.0, wherein hypot (p1, p2) denotes an argument to return $(p1*p1+p2*p2)^{0.5}$, w denotes a width of the vehicle, R denotes Vsp/dψ/dt (Vsp denotes a vehicle speed of the vehicle and dψ/dt denotes a yaw rate of the vehicle) in a case where Vsp>30 Km/h and (lf+lr)/Str in a case where Vsp≦30 Km/h, wherein lf denotes a distance from a front road wheel to a weight center of the vehicle and lr denotes a distance from a rear road wheel to the weight center of the vehicle.

13. An obstacle detection apparatus for an automotive vehicle as claimed in claim 1, wherein the second importance as obstacle calculating section calculates the second importance as obstacle on the basis of the following equation:

$$Recog\_Dist[i]=(-0.2/w/2)*abs(hypot(Py\_zo[i]-R)-R)+1.0,$$

wherein hypot(p1, p2) denotes an argument to return $(p1*p1+p2*p2)^{0.5}$, abs (A) denotes an absolute value of argument A, w denotes a width of the vehicle, R denotes Vsp/dψ/dt (Vsp denotes a vehicle speed of the vehicle and dψ/dt denotes a yaw rate of the vehicle) in a case where Vsp>30 Km/h and (lf+lr)/Str in a case where Vsp≦30 Km/h, wherein lf denotes a distance from a front road wheel to a weight center of the vehicle and lr denotes a distance from a rear road wheel to the weight center of the vehicle.

14. An obstacle detection apparatus for an automotive vehicle as claimed in claim 1, wherein the object position detecting section comprises a radar and the image fetching section comprises a CCD camera, wherein the image processing object tracking section continues tracking of the object through image processing when the same object determining section determines that the selected object is the same as the tracked object and the reliability of the processing state of the image processing object tracking section is higher than a predetermined value.

15. An obstacle detection apparatus for an automotive vehicle as claimed in claim 1, wherein the object position detecting section comprises a radar and the image fetching section comprises a CCD camera, wherein the image processing object tracking section continues tracking of the object through image processing when the same object determining section determines that the selected object is the same as tracked object, the reliability of the processing state of the image processing object tracking section is lower than a predetermined value, and when at least one of the first importance as obstacle and the second importance as obstacle is higher than another predetermined value.

16. An obstacle detection apparatus for an automotive vehicle as claimed in claim 1, wherein the object position detecting section comprises a radar and the image fetching section comprises a CCD camera, wherein the image processing object tracking section forcibly ends tracking of the object through image processing and an initial extraction process on the basis of the position of radar detected object is executed when the same object determining section determines that the selected object is the same as the tracked object, the reliability of the processing state of the image processing object tracking section is lower than a predetermined value, and when at least one of the first importance as obstacle and the second importance as obstacle is lower than another predetermined value.

17. An obstacle detection apparatus for an automotive vehicle as claimed in claim 1, wherein the object position detecting section comprises a radar and the image fetching section comprises a CCD camera, wherein the image processing object tracking section continues tracking of the object through image processing when the same object determining section determines that the selected object is different from the tracked object and when both of the first importance as obstacle and the second importance as obstacle are higher than a predetermined value.

18. An obstacle detection apparatus for an automotive vehicle as claimed in claim 1, wherein the object position detecting section comprises a radar and the image fetching section comprises a CCD camera, wherein the image processing object tracking section forcibly ends tracking of the object through image processing and an initial extraction process on the basis of the position of a radar detected object is executed when the same object determining section determines that the selected object is different from that under the tracking and when both of the first importance as obstacle and the second importance as obstacle are lower than a predetermined value.

19. An obstacle detection apparatus for an automotive vehicle, comprising:
- object position detecting means for detecting a position of each object located in a forward detection zone of the vehicle;
- image fetching means for fetching a situation of the forward detection zone in a form of an image;
- noticeable object selecting means for selecting only one of most noticeable objects for the vehicle on the basis of the detected position of each object;
- image processing object tracking means for tracking the selected object of the noticeable object selecting means through an image processing for the fetched image;
- first importance as obstacle calculating means for calculating a first importance as obstacle, wherein the first importance represents a possibility that the selected object becomes an obstacle for the vehicle on the basis of an output result of the object position detecting means;
- second importance as obstacle calculating means for calculating a second importance as obstacle, wherein the second importance represents a possibility that the tracked object becomes the obstacle for the vehicle on the basis of an output result of the image fetching means;
- same object determining means for determining whether the selected object by the noticeable object selecting means is the same as the tracked object of the image processing object tracking means;
- image processing reliability outputting means for outputting a reliability of a processing state of the image processing object tracking means; and
- tracking object selecting means for selecting the object for the image processing object tracking means based on the first importance, the second importance, and the reliability when the same object determining means determines that the selected object is the same as the tracked object, and for the selecting the object of the image processing object based on the first importance and the second importance, when the same object determining means determines that the selected object is different from the tracked object.

20. An obstacle detection method for an automotive vehicle, comprising:
- detecting a position of each object located in a forward detection zone of the vehicle;
- fetching a situation of the forward detection zone in a form of an image;
- selecting only one of most noticeable objects for the vehicle on the basis of the detected position of each object;
- tracking the selected object of the noticeable object selection through image processing of the fetched image;
- calculating a first importance as obstacle, wherein the first importance represents a possibility that the selected object becomes an obstacle for the vehicle on the basis of an output result at the detection of the position of each object;
- calculating a second importance as obstacle, wherein the second importance represents a possibility that the tracked object becomes the obstacle for the vehicle on the basis of an output result of fetching a situation of the forward detection zone in the form of the image;
- determining whether the selected object is the same as the tracked object;
- outputting a reliability of a processing state of the image processing object tracking; and
- selecting the object tracked with the image processing object tracking based on the first importance, the second importance, and the reliability when it is determined that the selected object is the same as that tracked object; and
- selecting the object tracked with the image processing object tracking based on the first importance and the second importance when it is determined that the selected object is different from that under the tracking.

* * * * *